No. 768,172. PATENTED AUG. 23, 1904.
W. A. ENGLE.
CUT-OUT VALVE FOR LOCOMOTIVES.
APPLICATION FILED APR. 11, 1904.
NO MODEL.
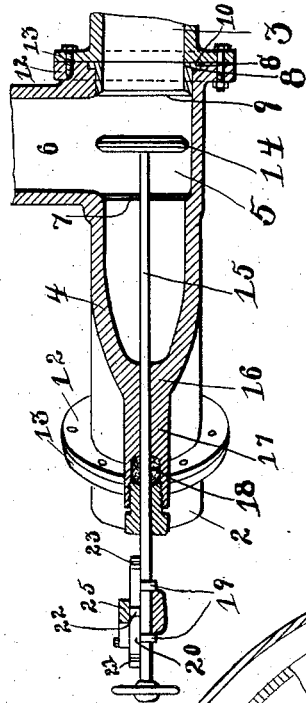
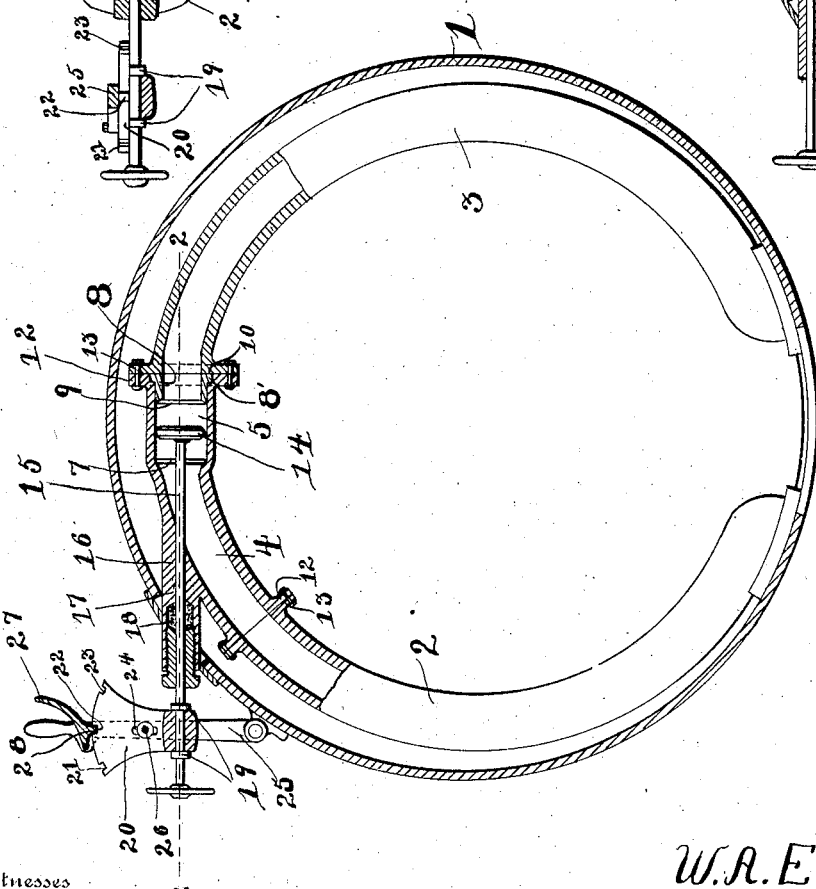
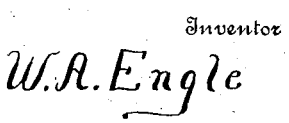
Witnesses
G. R. Thomas
L. O. Hilton
Inventor
W. A. Engle
By H. B. Wilson
Attorney No. 768,172.

Patented August 23, 1904.

UNITED STATES PATENT OFFICE.

WILLIAM A. ENGLE, OF POTTSVILLE, PENNSYLVANIA.

CUT-OUT VALVE FOR LOCOMOTIVES.

SPECIFICATION forming part of Letters Patent No. 768,172, dated August 23, 1904.

Application filed April 11, 1904. Serial No. 202,675. (No model.)

*To all whom it may concern:*

Be it known that I, WILLIAM A. ENGLE, a citizen of the United States, residing at Pottsville, in the county of Schuylkill and State of Pennsylvania, have invented certain new and useful Improvements in Cut-Out Valves for Locomotives; and I do declare the following to be a full, clear, and exact description of the invention, such as will enable others skilled in the art to which it appertains to make and use the same.

This invention relates to improvements in cut-out valves for locomotives.

The object of the invention is to provide an emergency-valve by which the supply of steam may be cut off from the cylinders on either side of the locomotive without interfering with the operation of the other side.

With this object in view the invention consists of certain novel features of construction, combination, and arrangement of parts, as will be more fully described, and particularly pointed out in the appended claims.

In the accompanying drawings, Figure 1 is a vertical sectional view through the smoke-box and steam-pipes of a locomotive, showing the arrangement of the valve. Fig. 2 is a fragmentary horizontal sectional view taken on the line 2 2 of Fig. 1. Fig. 3 is a detail vertical sectional view of the upper portion of the steam-pipes, showing a modified construction of valve.

Referring more particularly to the drawings, 1 denotes the smoke-box of a locomotive. 2 and 3 denote the right and left steam-pipes, which are arranged in said smoke-box and communicate with the steam-chests and cylinders at each side of the locomotive. The steam-pipes 2 and 3 are of the usual curved or semicircular form and at their upper ends are connected by a short angle-pipe 4, having at one end an enlargement 5, with which is connected the forward end of the dry pipe 6.

At the inner end of the enlargement 5 is formed a valve-seat 7, and in the outer end of the same is arranged a reducing-collar 8, on the inner end of which is formed a valve-seat 9. The collar 8 is provided on its outer end with an annular flange 8', which is adapted to rest in an annular recess 10, formed in the outer end of the enlargement 5. The angle-pipe 4 is formed on each end with annular flanges 12, by which the same is bolted to similar flanges 13 on the upper end of the steam-pipes 2 and 3.

In the enlargement 5 of the pipe 4 is arranged a valve 14, which is adapted to be engaged with one or the other of the valve-seats 7 or 9 to close the end of either of the pipes 2 or 3. To the valve 14 is connected the inner end of a stem 15, which projects out through the upper side of the pipe 4 and through a guideway or passage 16 in a bearing-bracket or boss 17, formed on said pipe 4. In the outer end of said boss is arranged a stuffing-box or gland 18, through which said valve-stem also passes. The outer end of this boss projects through an opening in the side of the smoke-box, as shown. The outer end of the valve-stem 15 is provided with a hand-wheel, which permits the stem and its attached valve being rotated in order to remove any foreign matter off the valve 14 or its seats 7 and 9, thus insuring a steam-tight fit.

Near the outer end of the valve-stem is secured two collars 19, between which is pivotally connected to said shaft a segmental rack or quadrant 20, in which is formed the notches 21, 22, and 23, and in the quadrant is also formed a vertically-disposed slot 24. To the side of the smoke-box below the quadrant is pivotally connected an operating-lever 25, which is slidingly connected with the quadrant 20 by means of a bolt 26, which passes through the slot 24.

On the upper end of the lever 25 is pivotally connected a pawl 27, having a tooth 28, which is adapted to be engaged with one or the other of the notches in the quadrant. When the lever 25 is pushed inwardly toward the boiler, the valve 14 will be engaged with the seat 9, thereby cutting off the supply of steam to the steam-pipe 3, and when said valve is in this position the pawl 27 will be engaged with the notch 23, thereby holding the valve upon its seat.

When the lever is pulled outwardly to the opposite end of the quadrant, the valve will be engaged with the seat 7, thereby cutting off the steam from the steam-pipe 2, and when the parts are in this position they are locked by the engagement of the pawl 27 with the notch 21.

When the lever 25 is in a perpendicular position and the pawl in engagement with the central notch 22, the valve will occupy a position midway between the seats 7 and 9, thereby permitting steam to enter from the dry pipe and pass into both of the steam-pipes 2 and 3 and from thence to the cylinders on each side of the locomotive.

In Fig. 3 of the drawings is shown a modified form of valve-operating mechanism. In this instance the stem 15 of the valve 14 is provided with screw-threads 30, which engage with threads 31, formed on the walls of the passage or guideway 16 in the bracket or boss 17, and on the outer end of this form of valve-stem is secured a hand-wheel 32, by which the valve-stem may be screwed inwardly or outwardly to engage the valve 14 with either of the valve-seats 7 or 9 to open or close the pipes 2 or 3.

By the arrangement of an emergency-valve as herein shown and described it will be seen that in case of an accident the cylinder on either side of the locomotive or to the parts connected or controlled thereby the supply of steam to such side may be quickly cut off from the same without disconnecting any of the parts or interfering in any manner with the operation of the cylinder on the other side of the locomotive.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination, with the steam-pipes of an engine, of a dry pipe branched therefrom, a valve-seat at each side of said branched pipe in the steam-pipes, and a valve comprising a stem having a head at one end adapted to fit either of the valve-seats by a straight movement of the stem, substantially as described.

2. The combination, with the steam-pipes of an engine, of a branch pipe, a valve-seat at each side of said branch pipe, in the steam-pipes, a valve-stem fitted to move in a straight line, a valve-head mounted upon one end of said stem, and means for moving said valve-head to close either of the valves, substantially as described.

3. The combination with the steam-pipes of an engine, of an angle-pipe connecting the upper ends of said steam-pipes, a valve-chamber formed in one end of said angle-pipe, a valve-seat formed in one end of said chamber, a reducing-collar arranged in the opposite end of the same, a valve-seat formed on the inner end of said reducing-collar, a valve comprising a straight stem having a double valve-head thereon adapted to be engaged with one or the other of said seats to close that end of the valve-chamber, a pivoted lever and a notched quadrant for adjusting said valve and means for locking said valve-head in engagement with one or the other of said seats or in a position midway between the same, substantially as described.

4. The combination with the steam-pipes of an engine, of an angle-pipe connecting the upper ends of said steam-pipes, a valve-chamber formed in one end of said angle-pipe, valve-seats formed at the opposite ends of said chamber, a valve adapted to be engaged with one or the other of said seats or to occupy a position midway between the same, a valve-stem slidably mounted in a guideway or passage formed in the side of said angle-pipe, a double valve-head secured to said stem and adapted to close either valve, said stem being connected at its inner end to said valve-head, a segmental rack arranged on the outer end of said valve-stem, an operating-lever pivoted to the side of the locomotive and having a sliding engagement with said rack whereby the same may be actuated by said lever to adjust said valve, and a pawl carried by said lever to engage said rack and lock said valve in its adjusted position, substantially as described.

In testimony whereof I have hereunto set my hand in presence of two subscribing witnesses.

WM. A. ENGLE.

Witnesses:
  BEN G. COWL,
  C. H. GRIESBAUER.